(12) United States Patent
Biener et al.

(10) Patent No.: US 8,231,770 B2
(45) Date of Patent: Jul. 31, 2012

(54) NANOPOROUS CARBON ACTUATOR AND METHODS OF USE THEREOF

(75) Inventors: Juergen Biener, San Leandro, CA (US); Theodore F. Baumann, Discovery Bay, CA (US); Lihua Shao, Karlsruhe (DE); Joerg Weissmueller, Stutensee (DE)

(73) Assignee: Lawrence Livermore National Security, LLC, Livermore, CA (US)

( * ) Notice: Subject to any disclaimer, the term of this patent is extended or adjusted under 35 U.S.C. 154(b) by 326 days.

(21) Appl. No.: 12/723,215

(22) Filed: Mar. 12, 2010

(65) Prior Publication Data

US 2010/0230298 A1 Sep. 16, 2010

Related U.S. Application Data

(60) Provisional application No. 61/159,855, filed on Mar. 13, 2009.

(51) Int. Cl.
*G01N 27/403* (2006.01)
*H01L 41/047* (2006.01)
*G01L 1/20* (2006.01)

(52) U.S. Cl. .............. 204/450; 204/600; 310/323.06; 310/11

(58) Field of Classification Search .......... 204/450, 204/600; 73/1.15, 760, 781, 787, 789, 862.044, 73/862.045; 310/10, 11, 12.27, 323.06
See application file for complete search history.

(56) References Cited

U.S. PATENT DOCUMENTS

| 7,872,396 B2 * | 1/2011 | Chiang et al. | 310/311 |
| 2005/0287421 A1 * | 12/2005 | Simon et al. | 429/44 |
| 2008/0152958 A1 * | 6/2008 | McLean | 429/12 |
| 2010/0144904 A1 * | 6/2010 | Wang et al. | 516/98 |

FOREIGN PATENT DOCUMENTS

| EP | 1 224 676 | 10/2000 |
| EP | 1 621 875 | 7/2005 |

OTHER PUBLICATIONS

Biener et al., "Surface chemistry in nanoscale materials" Materials 2009, 1-x manuscripts; doi: 10.3390/ma20x000x www.mdpi.com/journal/materials.
Shao et al., "Electrocapillary maximum and potential of zero charge of carbon aerogel", p. 1-11.
Erfindungsmeldung.
Baumann et al., "High surface area carbon aerogel monoliths with hierarchical porosity" Journal of Non-Crystalline Solids 354 (2008) 3513-3515 www.elsevier.com/locate/jnoncrysol.
Kramer et al., "Surface-Stress Induced Macroscopic Bending of Nanoporous Gold Cantilevers" 2004 American Chemical Society, Nano Letters, 2004, vol. 4, No. 5, 793-796.

(Continued)

*Primary Examiner* — Alex Noguerola
(74) *Attorney, Agent, or Firm* — Dominic M. Kotab (57) ABSTRACT

An electrochemically driveable actuator according to one embodiment includes a nanoporous carbon aerogel composition capable of exhibiting charge-induced reversible strain when wetted by an electrolyte and a voltage is applied thereto. An electrochemically driven actuator according to another embodiment includes a nanoporous carbon aerogel composition wetted by an electrolyte; and a mechanism for causing charge-induced reversible strain of the composition. A method for electrochemically actuating an object according to one embodiment includes causing charge-induced reversible strain of a nanoporous carbon aerogel composition wetted with an electrolyte to actuate the object by the strain.

34 Claims, 10 Drawing Sheets

OTHER PUBLICATIONS

Weissmüller et al., "Charge-Induced Reversible Strain in a Metal" Science, vol. 300, Apr. 11, 2003 www.sciencemag.org.

Biener et al., "Surface-chemistry-driven acutation in nanoporous gold" Nature Materials, vol. 8, Jan. 2009, published online: Nov. 30, 2008: DOI:10:1038/NMAT2335.

Kabbour et al., "Communications: Toward New Candidates for Hydrogen Storage: High-Surface-Area Carbon Aerogels" Chemistry of Materials, vol. 18, No. 26, Dec. 26, 2006.

Baughman et al., "Carbon Nanotuhe Actuators" Science, vol. 284 May 21, 1999 www.sciencemag.org.

* cited by examiner

NANOPOROUS CARBON ACTUATOR AND METHODS OF USE THEREOF

RELATED APPLICATIONS

This application claims priority to provisional U.S. Application Ser. No. 61/159,855 filed on Mar. 13, 2009, which is herein incorporated by reference.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to carbon aerogels, and particularly, to electrochemically-driven actuators based on nanoporous carbon materials.

BACKGROUND

Surface stress induced macroscopic and reversible strain effects have been observed for nanoporous metals in an electrochemical environment, according to conventional techniques, such as those disclosed in *Science* 300, 312 (2003) and *Nano Lett.* 4, 793 (2004). These macroscopic and reversible strain effects can be explained by changes of the surface electronic charge density through an applied potential relative to an electrolyte impregnating the pores. In particular, nanoporous platinum (Pt) and gold (Au) have been demonstrated to yield strain amplitudes comparable to those of commercial ferroelectric ceramics. Whether this charge-transfer induced macroscopic strain effect can be used to develop a new economically viable actuator technology will strongly depend on materials costs, efficiency, and long-term stability of the structures proposed. However, nanoporous noble metals such as nanoporous Pt and Au are heavy and costly, and are susceptible to degrading aging effects over time.

Therefore, it would be beneficial to reduce costs associated with developing, manufacturing, and using nanoporous metal actuators by using a less expensive material which improves the long-term stability of the structures produced, and enhances the mass-specific stored energy density by using more lightweight materials. Carbon based materials have been used in some applications, as disclosed in R. H. Baughman et al., *Science* 284, 1340 (1999), where carbon nanotubes were used for actuation. Although this is a light-weight material, it is only available in rope or sheet geometries and not as three dimensional bodies capable of shaping, forming, and molding to application specific dimensions, which prevents loading in compression. Furthermore, these materials at present are prohibitively costly. Therefore, they do not currently present a viable solution to the above described problems.

SUMMARY

An electrochemically driveable actuator according to one embodiment includes a nanoporous carbon aerogel composition capable of exhibiting charge-induced reversible strain when wetted by an electrolyte and a voltage is applied thereto.

An electrochemically driven actuator according to another embodiment includes a nanoporous carbon aerogel composition wetted by an electrolyte; and a mechanism for causing charge-induced reversible strain of the composition.

A method for electrochemically actuating an object according to one embodiment includes causing charge-induced reversible strain of a nanoporous carbon aerogel composition wetted with an electrolyte to actuate the object by the strain.

A system for actuating an object according to one embodiment includes an electrochemically driven actuator, comprising: a nanoporous carbon aerogel composition wetted by an electrolyte; a mechanism for causing charge-induced reversible strain of the composition; and a mechanism for regulating an amount of the electrolyte contacting a surface of the composition, thereby controlling the amount of charge-induced reversible strain of the composition.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the GENERAL PRINCIPLES of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As used herein, the term "about" when combined with a value refers to plus and minus 10% of the reference value unless otherwise specified. For example, a temperature of about 50° C. refers to a temperature of 50° C.±5° C., etc.

An actuator converts an external signal into a mechanical response by changing its dimensions. A well-known example for such a device is a piezoelectric actuator. The following discloses a novel actuator technology based on charge-transfer induced modifications of the interatomic bonding of suitable actuator materials. To take full advantage of this technology, in accordance with some embodiments, a novel monolithic carbon aerogel with a three-dimensional architecture has been developed that combines both an ultra-high surface area and mechanical strength/robustness. In some preferred embodiments, the monolithic carbon aerogel with a three-dimensional architecture is comprised of nano-particles of graphene. Graphene in one embodiment is a one-atom-thick layer of a carbon lattice with a honeycomb structure.

In contrast to piezoelectric materials where the dimensional changes are caused by the polarization of the whole material, the carbon-based actuators disclosed herein according to some embodiments used charge-induced changes of the surface stress. Microscopically, surface stress is a consequence of the fact that surface atoms 'prefer' interatomic spacings different from those of the underlying bulk material. The surface stress of a given material is not a constant, but is sensitive to charge transfer processes at the surface. Thus the surface stress can be manipulated by adsorption of strongly interacting atoms or molecules, or by applying a potential in an electrochemical environment. For the actuators disclosed herein, the latter strategy is used. A high surface area of the material is preferred, as fully dense bulk materials are usually not affected by changes of the surface stress. In some preferred embodiments, the monolithic carbon aerogel with a three-dimensional architecture is comprised of one-atom-thick layers of graphite (nano-graphene). In this case, the distinction between bulk and surface behavior that underlies the definition of surface stress becomes inappropriate, and the surface atoms are free to adapt their equilibrium interatomic spacings that, in one embodiment, are controlled by charge transfer. Using material that has surface areas as high as 3000 $m^2/g$ in some approaches, macroscopic strain effects up to about one percent have been achieved in experimentation. This is comparable to the strain amplitudes of commercial piezoelectric actuators.

Figure 1:
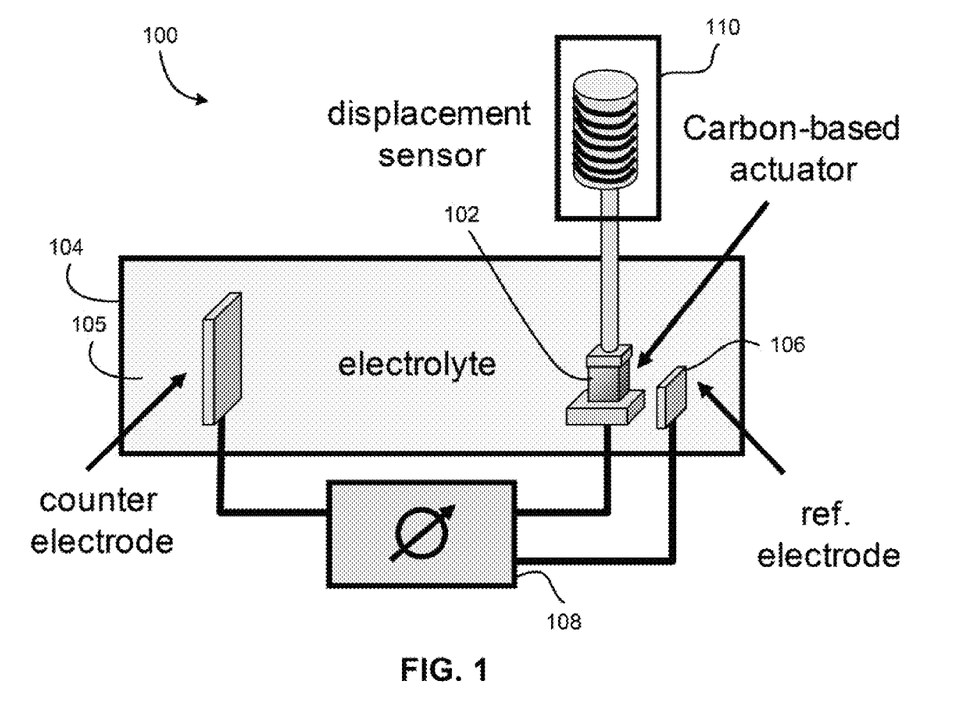
FIG. 1 is a system diagram employing an electrochemical actuator according to one embodiment.

In experiments conducted by the inventors, electrochemical actuation was realized by using a system 100 similar to that shown in FIG. 1. Similar systems may be used when employing the teachings presented herein to real-world uses. As shown in FIG. 1, a carbon material 102 is used as an electrode in an electrochemical cell 104 having electrolyte 105 therein. A small voltage (relative to a reference electrode 106) is applied to the carbon material 102 using a voltage source 108. A displacement sensor 110 may be used to measure an amount of actuation of the carbon material 102 upon application of the voltage thereto.

Figure 5:
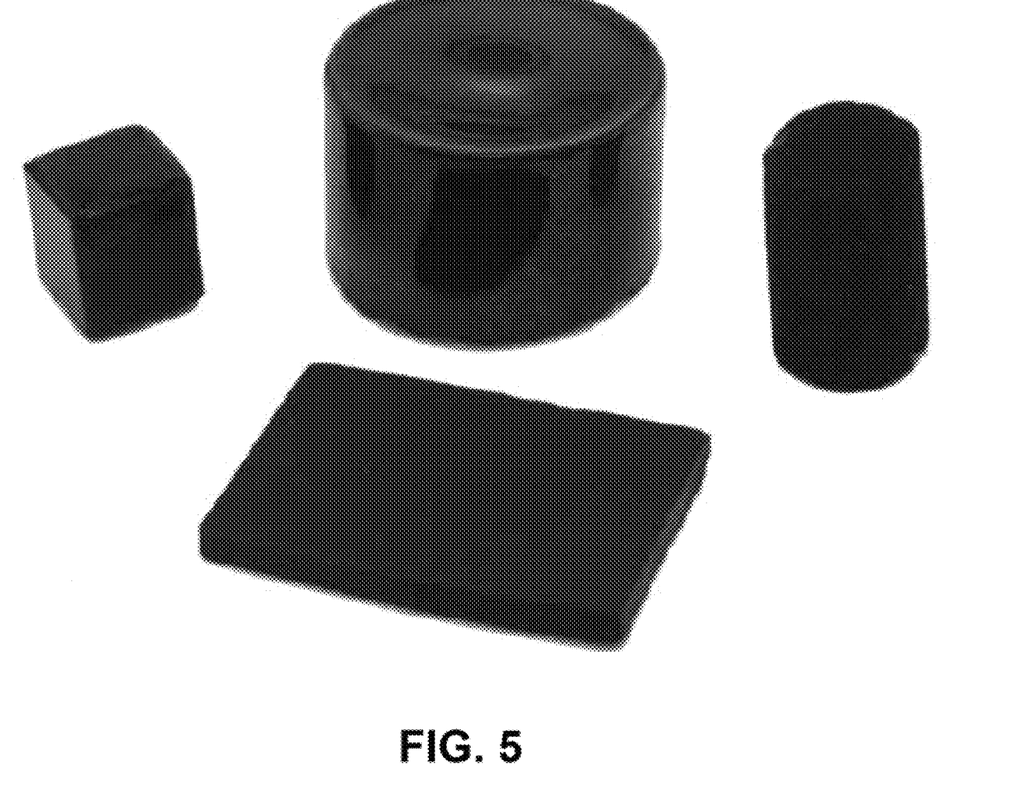
FIG. 5 depicts various possible shapes of CAs according to illustrative embodiments.

Compared to traditional piezoelectric materials, this technology has several advantages. For example, a carbon-based actuator material is light-weight, inexpensive and environmentally friendly (e.g., lead is not a required material). Also, the technology is scalable, that is, large monolithic actuators can be envisioned, e.g., greater than about 1 $mm^3$, greater than about 1 $cm^3$, greater than about 10 $cm^3$, etc. Moreover, such larger structures may be formed of one contiguously-formed structure or several smaller structures coupled together. Moreover, the material can be formed or machined in many different shapes, as depicted in FIG. 5.

Further advantages include the technology is safe: a low-voltage driving signal may be used in some embodiments. Further, the material in some embodiments is thermally stable up to at least 1000 degrees C. (in an inert atmosphere), and potentially up to about 1500 degrees C. and thus may allow for high temperature applications depending on the thermal stability of the electrolyte. In addition, the material in some embodiments is equally well-suited for hydrogen storage, supercapacitor and electro-catalysis applications (fuel cells).

In one general embodiment, an electrochemically driveable actuator includes a nanoporous carbon aerogel composition capable of exhibiting charge-induced reversible strain when wetted by an electrolyte and a voltage is applied thereto.

In another general embodiment, an electrochemically driven actuator includes a nanoporous carbon aerogel composition wetted by an electrolyte, and a mechanism for causing charge-induced reversible strain of the composition.

According to another general embodiment, a method for electrochemically actuating an object includes providing a nanoporous carbon aerogel composition, wetting the composition with an electrolyte, and causing charge-induced reversible strain of the composition wetted with the electrolyte such that an object is actuated by the strain.

In yet another general embodiment, a system for actuating an object includes an electrochemically driven actuator, which has a nanoporous carbon aerogel composition wetted by an electrolyte, a mechanism for causing charge-induced reversible strain of the composition, and a mechanism for regulating an amount of the electrolyte contacting a surface of the composition, thereby controlling the amount of charge-induced reversible strain of the composition.

In some embodiments, electrochemical induced macroscopic strain effects of nanoporous carbon structures can be achieved, and more particularly, a combination of (1) a bulk nanoporous carbon material with extreme surface area, and (2) electrochemical addressing of the surfaces of the bulk nanoporous carbon material for actuation can be used, according to some approaches. An electrochemically-driven actuator based on a new nanoporous carbon material is described in some embodiments, which has a three dimensional (3D) structure, and may be made in the form of monolithic 3D bodies which can be loaded in both tension and compression.

Specifically, a new class of carbon with extremely high mass-specific surface area (up to about 3000 $m^2/g$) has been investigated for use in some embodiments described herein. Carbon aerogels (CAs) are novel mesoporous materials which combine many interesting properties such as low mass densities, continuous porosities, high surface areas, high electrical conductivities, and excellent mechanical properties. The properties of CAs are derived from their microstructure, which is typically a network of interconnected primary particles with characteristic diameters of between about 3 nm and about 25 nm, though the dimensions could be higher and/or lower. The material forms macroscopic (for instance, mm-sized) monolithic bodies that support compressive stress and shear stress.

The strain-charge response of these materials was tested in an experimental setup comprising a miniaturized electrochemical cell made of glass which was operated in the sample space of a commercial dilatometer. The aerogel was wetted by aqueous (salt solutions such as NaF in $H_2O$, sulfuric acid, perchloric acid, etc.) or nonaqueous electrolytes. The results of the experiments showed that large reversible strains of 1% can be realized. Even larger strains may be realized by further optimizing the wetting of the carbon aerogel and optimizing the electrolyte composition and concentration. The results clearly demonstrate the advantages, e.g., low cost, low weight, large amplitude actuation, of using carbon aerogels in many different applications.

According to some embodiments, the properties of CAs can be tailored for specific applications by controlling their morphology and/or by adding surface functionalities. The design of new porous carbon materials holds technological promise for a variety of applications, including catalysis, hydrogen storage, and energy storage. The utility of these materials may be derived from their high surface areas, electrically conductive frameworks, and chemical stability. CAs are a unique class of porous carbons that possess ultrafine cell sizes, continuous porosities, and low mass densities. These properties arise from the aerogel microstructure, a three-dimensional network of interconnected primary carbon particles with diameters that can range from a few nanometers to several microns. In contrast to the metallic bonding in nanoporous Au, CAs are a covalently bound material which makes them more stable against thermal coarsening. In addition, the graphitic character of the CA surface adds further stability to the structure.

Figure 2:
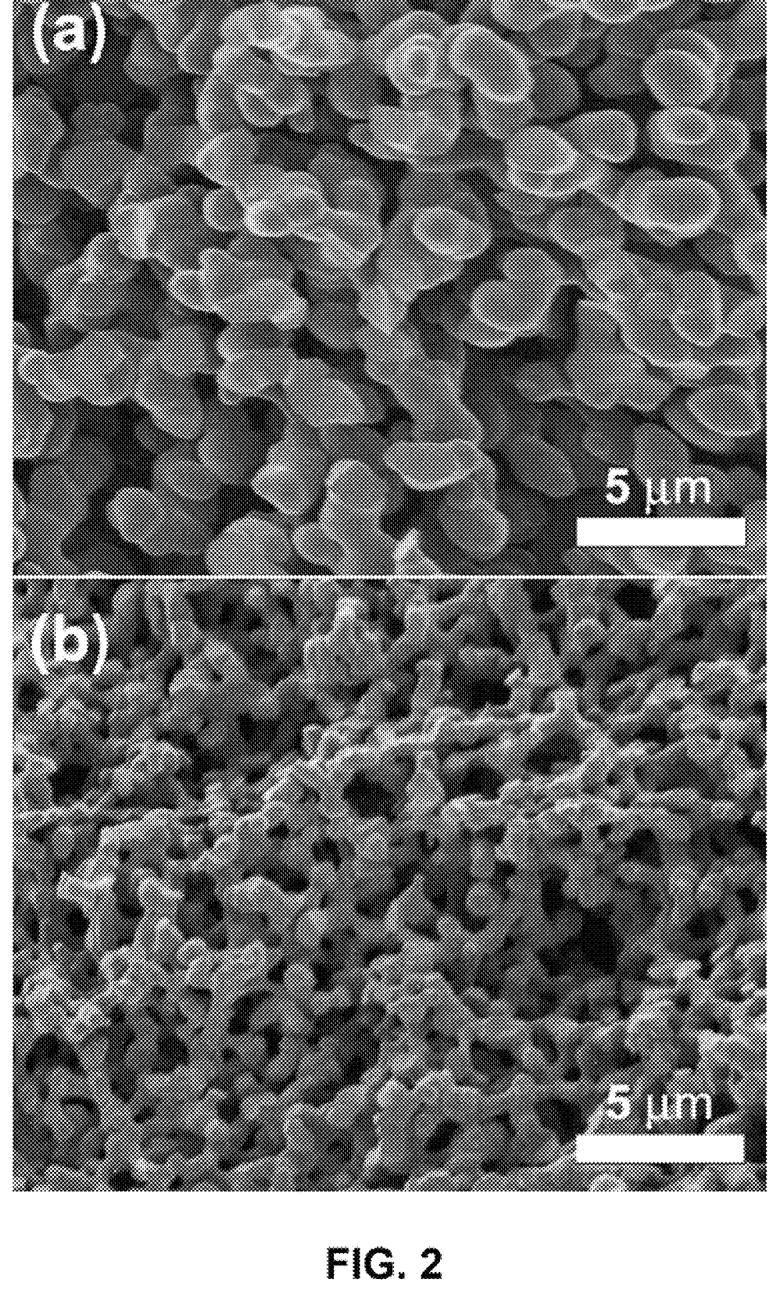
FIG. 2 includes two SEM micrographs, a) a pre-activated CA, and b) an activated CA with a surface area of 3200 m²/g.

According to some approaches, CAs may be prepared through a sol-gel polymerization of organic precursors, such as resorcinol and formaldehyde, in aqueous solution to produce highly cross-linked organic gels that are supercritically dried and subsequently pyrolyzed in an inert atmosphere. Pyrolysis of the organic aerogel then yields a porous carbon network, comprised of both amorphous and graphitic regions, as shown in FIG. 2, which includes SEM images of the pre-activated CA in (a), and an activated CA with a surface area of 3200 $m^2/g$ in (b). The graphitic domains are typically quite small and include a significant amount of disorder. Unlike many other porous carbons, CAs may be fabricated in a variety of forms, including monoliths and thin films, a feature that can be advantageous for many applications.

The structure-property relationships of CAs are largely determined by the sol-gel reaction chemistry. Several factors of the polymerization reaction have a significant impact on network formation in these materials. For example, the amount and type of polymerization catalyst used in the sol-gel reaction influences nucleation, growth, and interconnectivity of the primary particles that comprise the aerogel framework. The morphology and spatial arrangement of these particles, in turn, may determine the bulk physical properties of the CA. For instance, electrical conductivity in CAs occurs through the movement of charge carriers through individual carbon particles and "hopping" of these carriers between adjacent carbon particles. Therefore, charge transport is highly dependent on interconnectivity of the carbon network. Likewise, a number of other bulk properties, such as specific surface area, compressive modulus, and thermal conductivity, correlate with the network architecture and, therefore, can be tuned through the reaction chemistry.

Utilizing this flexibility, a synthetic approach to fabricate mechanically robust, high surface area CA monoliths has been developed for energy storage applications. This approach to access high surface areas in monolithic parts involved the thermal activation of a CA material with structural features (particles and pores) on the micrometer scale. The microstructure of traditional CAs, having nanometer-sized carbon particles and tortuous pore structures, can both limit the attainable surface areas through activation and lead to inhomogeneous activation in monolithic samples. By utilizing CAs with larger pore and particle sizes, however, these issues can be mitigated and monolithic CAs with BET surface areas in excess of 3000 $m^2/g$ can be prepared. These values are greater than the surface area of a single graphene sheet (e.g., 2630 $m^2/g$, if both graphene surfaces are taken into account). Presumably, edge termination sites constitute a substantial fraction of the surface area in these activated CAs, as is the case for traditional high surface area activated carbons. Another benefit of this design strategy is that the process yields materials with bimodal porosity (macropores and micropores). Hierarchically porous carbons of this type present a number of advantages over unimodal carbon structures in terms of diffusion efficiency and surface area. Therefore, this approach offers viability to engineer new materials for use as catalyst supports, electrodes, capacitors, sorbent systems, etc.

Figure 3:
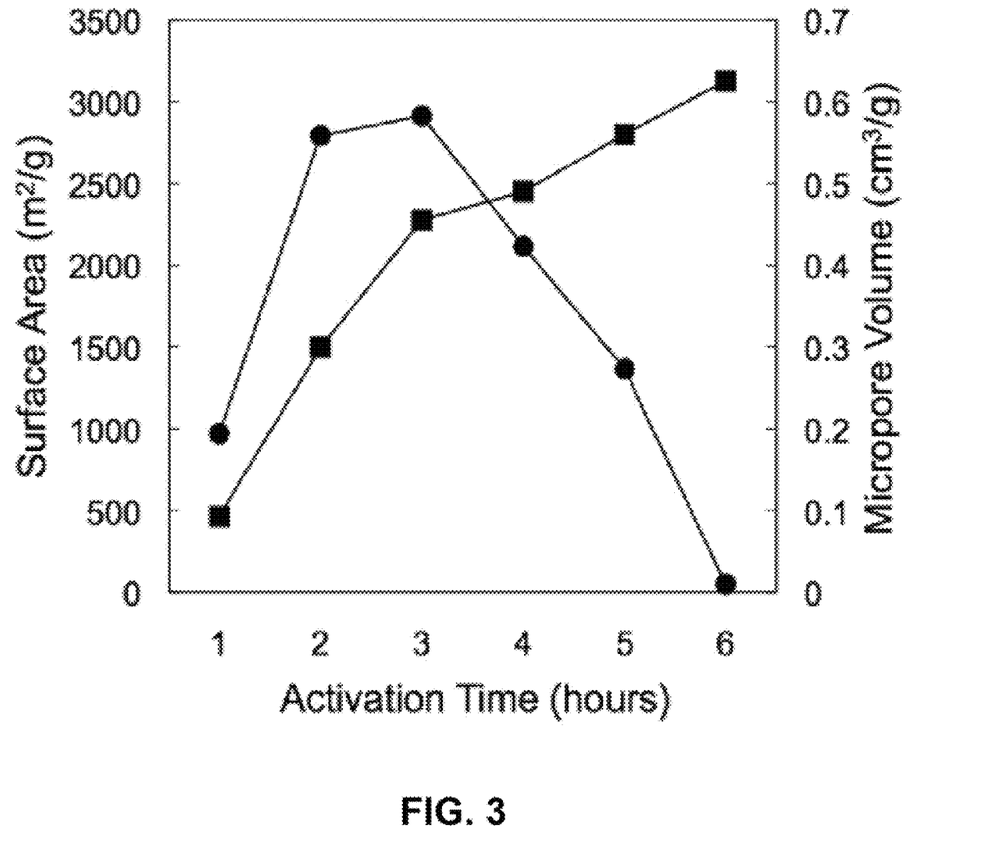
FIG. 3 is a plot showing BET surface area (square markers) and micropore volume (circular markers) for activated CAs as a function of activation time.

The CA structure used for activation may be prepared by the sol-gel polymerization of resorcinol and formaldehyde using acetic acid as the reaction catalyst. Of course, any materials suitable for sol-gel polymerization may be used as would be known to one of skill in the art. The skeletal structure of this material includes interconnected micron-sized carbon ligaments that define a continuous macroporous network, as shown in FIG. 2. These ligaments appear to be made up of spherical primary particles that have fused together during network formation. This structural motif is likely responsible for the enhanced mechanical integrity of these CA monoliths, both before and after activation. Despite being macroporous, the pre-activated CA still exhibits appreciable surface area (about 400 $m^2/g$) due to microporosity within the carbon ligaments. To increase the accessible surface area in this material, the CA can be thermally activated with carbon dioxide. Thermal activation involves the controlled burn-off of carbon from the network structure in an oxidizing atmosphere resulting in the creation of new micropores as well as opening of closed porosity in the CA framework. Examination of the CAs following activation shows smaller network ligaments relative to the unactivated material, due to burn-off of carbon from the aerogel framework, as shown in FIG. 3, a graph of the BET surface area (square markers) and micropore volume (circular markers) for the activated CAs as a function of activation time. As expected, the BET surface areas of the activated CAs increase with the length of activation. At shorter activation times, this new porosity is in the form of micropores (pores smaller than about 2 nm), as evidenced by the steady increase in micropore volume for materials up to about 2500 $m^2/g$.

At longer activation times, however, the micropore volume in these materials drops precipitously. This observation can be attributed to the widening of micropores during activation to sizes that cross the micropore-mesopore boundary, leading to the formation of "supermicropores" and/or small mesopores at longer treatment times. While these general trends are similar to those observed in other activated CAs, the key difference with these materials is that the larger network features of the pre-activated CA allows access to surface areas in excess of about 3000 $m^2/g$, the highest values for a CA. Interestingly, despite the significant mass loss, the activated materials remained monolithic and retained a high degree of mechanical integrity following activation. Due to their hierarchical pore structure and high accessible surface areas as well as their ability to be fabricated as conformable shapes, these materials have potential in a variety of applications, including those described herein, according to several embodiments.

In some embodiments, the carbon aerogel has a bimodal pore size distribution comprising macropores having an average diameter (between opposing inner surfaces) of greater than about 50 nm and micropores having an average diameter of less than about 2 nm. The macropores provide for efficient diffusion and mechanical stability, while the micropores provide the desirable high surface area.

Figure 4:
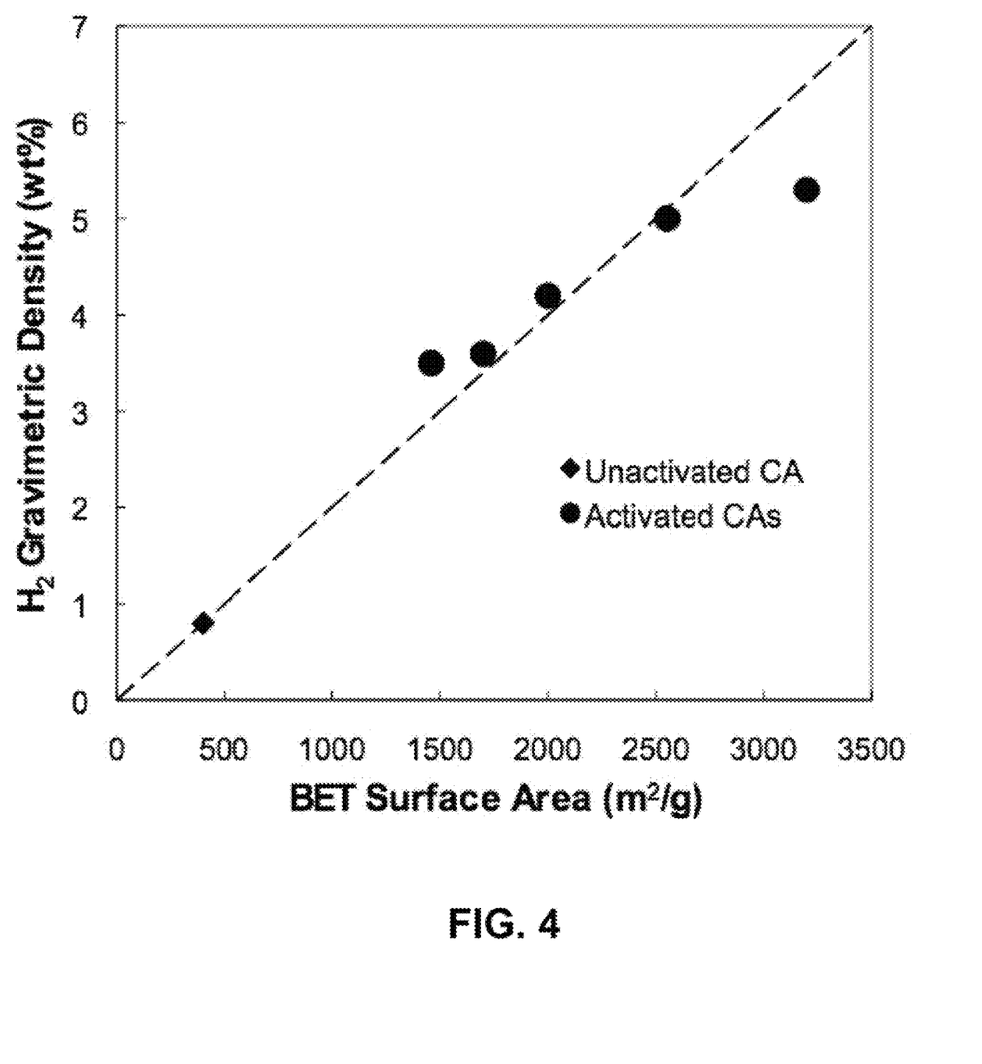
FIG. 4 is a plot of excess gravimetric density (wt % $H_2$) saturation value at 77K as a function of BET surface area. The dotted line shows correlation of 1 wt % per 500 m²/g.

To illustrate the high surface area of CA's, FIG. 4 is a graph showing excess gravimetric density (wt % $H_2$) saturation value at 77 K as a function of BET surface area for activated and unactivated CAs. As shown, the amount of surface excess hydrogen adsorbed on porous carbons at 77 K and about 3.5 MPa varies linearly with BET surface area; gravimetric uptake is about 1 wt % $H_2$ per 500 $m^2/g$ of surface area. The dotted line shows the correlation of 1 wt % per 500 $m^2/g$. This figure also speaks to the ability of the CA to act as a hydrogen storage medium.

Surface modifications of CAs, or nanoporous bulk materials in general, offer yet another means to further add functionalities to these already extremely versatile materials. A good example is the catalytic activity of Pt doped CAs. Although straightforward in theory, the infusion of metals or metal oxides into nanoporous bulk materials is difficult in reality due to their extremely high aspect ratios. Consequently, techniques commonly used for macro-cellular foams result in inhomogeneous or incomplete coatings. The diffusion limitation can be overcome by employing atomic layer deposition (ALD) which is a special variant of the chemical vapor deposition technique based on a suitable pair of sequential, self-limiting surface reactions, as shown in FIG. 5, a schematic diagram of an ALD method which employs sequential, self-limiting surface reactions to overcome diffusion limitations, according to one embodiment. Both conformal films (left) and individual nanoparticles (right) can be grown, depending on the surface chemistry. Consequently, the technique offers excellent atomic level control of the deposited film thickness.

Figure 6:
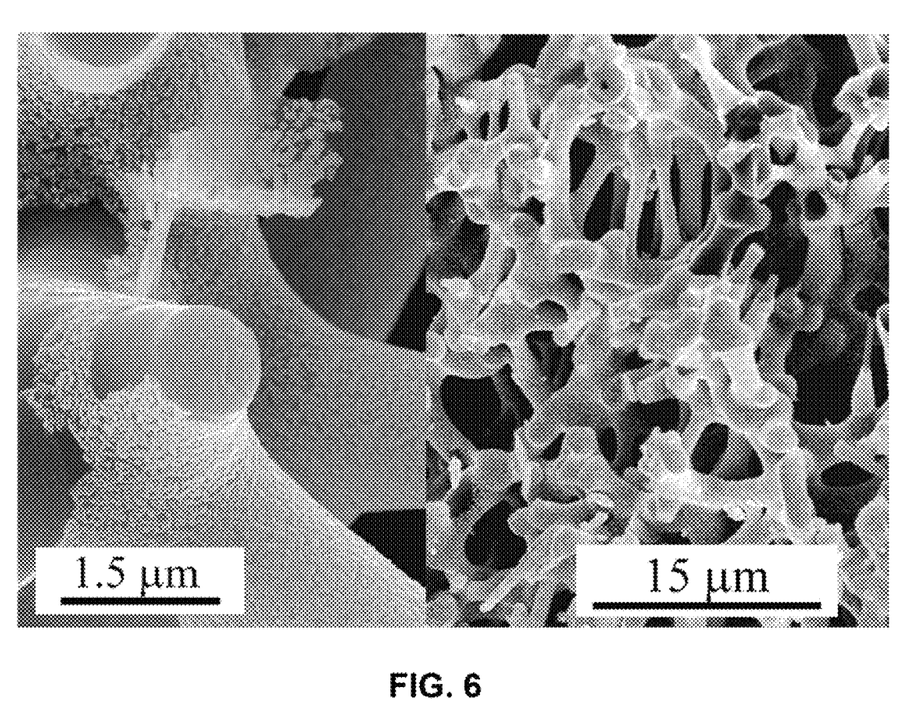
FIG. 6 includes SEM micrographs of the fracture surface of a Ru-coated CA at different magnification levels.

The method can be used for both oxidic and metallic deposits, and generates only volatile co-products, thus eliminating the necessity to perform additional reduction and cleaning steps. The morphology of the deposited material depends on the specific surface chemistry, and can range from individual nanoparticles to conformal films thus offering another powerful tool in the design of new nanoporus materials. This technique was used to deposit W, Ru, Pt, Cu, $TiO_2$, and ZnO on various aerogel templates, and generally good results were observed in terms of uniformity and conformality of the deposits as long as the vapor pressure of the precursor species is sufficiently high. A typical example is shown in FIG. 6 which demonstrates the formation of a continuous layer of Ru nanoparticles on the internal surfaces of a CA sample in two SEM micrographs of the fracture surface of a Ru-coated CA at different magnification levels. Note that the CA in FIG. 6 was not activated prior to depositing the Pt.

Figure 7:
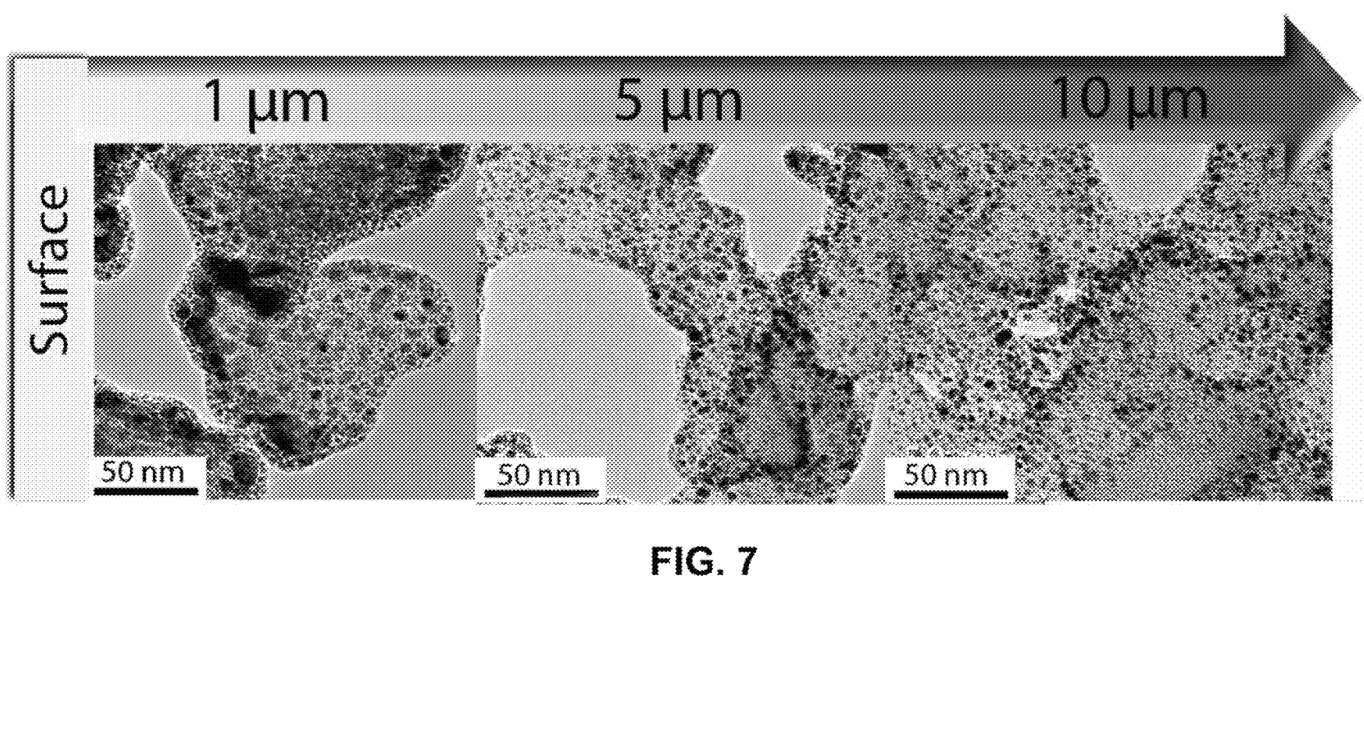
FIG. 7 shows the morphology of a Pt loaded CA (10 ALD cycles) in cross-sectional TEM micrographs revealing the high dispersion of Pt. The images were taken at different depths below the outer surface.

Platinum nanoparticle loaded high surface area carbon materials have become the most commonly used cathode catalysts in proton-exchange membrane fuel cells (PEMFCs) and direct methanol fuel cells (DMFCs). However, in order to achieve economic viability, the Pt loading needs to be further reduced to values below 1 mg/$cm^2$, according to some approaches. In order to achieve this, ALD is a promising alternative to traditional techniques such as wet impregnation as it offers precise control of the amount of deposited material, in some approaches. FIG. 7 shows the morphology of a Pt loaded CA (10 ALD cycles) in a series of cross-sectional TEM micrographs revealing the high dispersion of Pt. The images were taken at different depths below the outer surface. Note that the CA in FIG. 7 was not activated prior to depositing the Pt.

To enhance mass transport to or from deep within the structure, channels, e.g., holes, vias, etc. may be formed in the structure, e.g., by forming the material around a mold, by drilling, etc. This is useful to ensure more uniform application of the deposits, which in turn reduces potential gradients in actuation which could occur if the activation of the structure is not uniform throughout.

In summary, ALD is an efficient means to add catalytic activity to an otherwise inert nanoporous support. This allows the combination of the catalytic activity of metal surfaces with the robustness and flexibility offered by CAs.

According to one embodiment, an electrochemically driven actuator comprises a nanoporous carbon aerogel composition wetted by an electrolyte and a mechanism for causing charge-induced reversible strain of the composition. The mechanism may be an electrochemical cell, as shown and described in FIG. 1 or provisional U.S. Application Ser. No. 61/159,855. Of course, any other suitable mechanism may be used that allows the composition to be wetted by an electrolyte and causes charge-induced strain of the composition, such as a piston arrangement that allows linear force to be applied on an object, a rod and lever arrangement that allows rotational torque to be applied to an object, etc. In addition, the electrochemically driven actuator may be useful in any application where a piezoelectric actuator may be used, such as engines, motors, microscopes, x-ray positioning elements, laser positioning elements, etc.

In some approaches, the carbon aerogel may have a mass-specific surface area of greater than about 2000 $m^2/g$, and in some further approaches, greater than about 2800 $m^2/g$.

In more approaches, the carbon aerogel may include a network of interconnected primary particles, the primary particle having a characteristic diameter of between about 3 nm and about 25 nm. In further approaches, the characteristic diameter may be between about 3-10 nm, between about 5-15 nm, between about 12-25 nm, between about 5-20 nm, etc.

In some embodiments, the electrolyte may be aqueous or nonaqueous, and may be a solid-state electrolyte. In addition, the electrolyte may comprise at least one material selected from a list consisting of: NaF, KOH, KCl, $H_2SO_4$, and $HClO_4$. In another embodiment, the electrolyte may be an ionic liquid. Ionic liquids typically exhibit low vapor pressures, and can show high thermal stabilities. Thus ionic liquids can be advantageous for high-temperature applications.

In embodiments suitable for high temperature operation, e.g., at ambient temperatures higher than about 500 degrees C., and preferably higher than about 1000 degrees C., the CA is preferably protected from oxidation by being isolated from ambient oxygen, e.g., oxygen in air, in the electrolyte, etc. In one approach, a solid state or an ionic liquid electrolyte may be used. In another approach, the packaging enclosing the CA may provide a barrier to oxygen.

In some preferred embodiments, the mechanism may provide a voltage to the composition of less than about 1.5V, which is a voltage value far below those needed to actuate piezoelectric actuators, and therefore allows the composition to be used in devices where minimizing voltage usage is important, such as devices relying on solar power or other renewable sources, devices running on low power/long lasting batteries, etc.

In more embodiments, the composition may further include a coating material selected from a list consisting of: W, Ru, Pt, Cu, $TiO_2$, and ZnO. This coating material may impart specification characteristics or properties to the composition that may be useful in certain applications/situations, such as wear resistance, chemical resistance, etc. In some further approaches, the coating material may be deposited via atomic layer deposition, which provides for extremely accurate layer deposition.

Figure 8A:
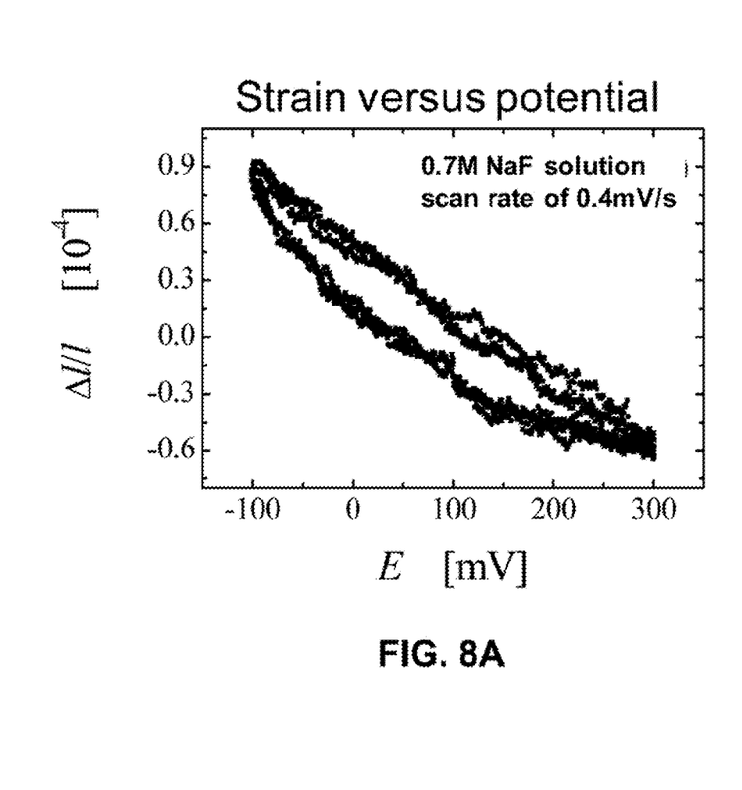
FIG. 8A is a chart of strain versus potential for a CA in a 0.7M NaF electrolyte according to one illustrative embodiment.

FIG. 8A illustrates strain versus potential (E) for a CA in a 0.7M NaF electrolyte for a voltage sweep of 400 millivolts. The strain is exemplified by the relative length change (Δl/l). As shown, the strain is a reversible phenomenon.

Figure 8B:
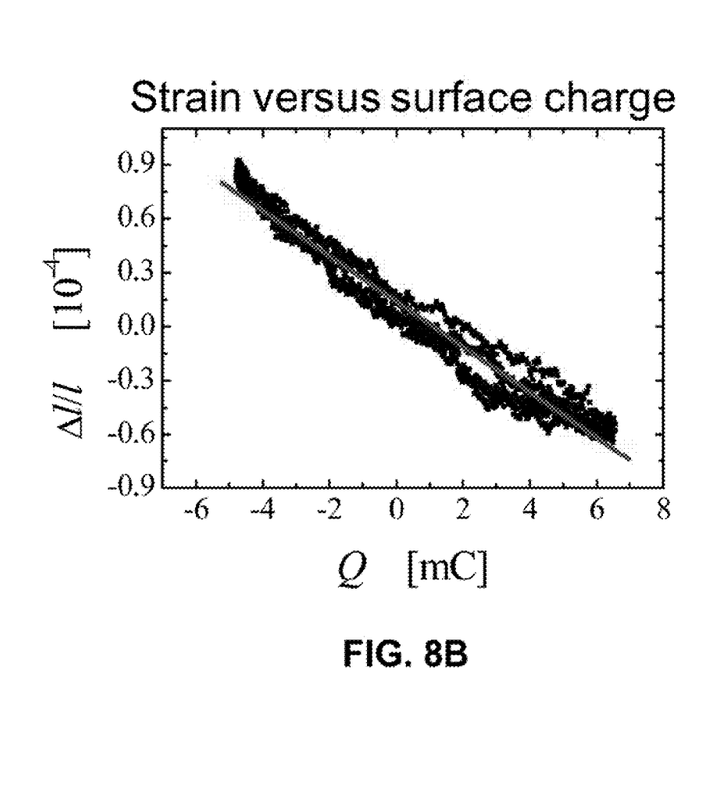
FIG. 8B is a chart of strain versus surface charge for a CA.

FIG. 8B illustrates strain versus surface charge (Q) for the same CA. Again, the strain is exemplified by the relative length change (Δl/l).

Figure 9:
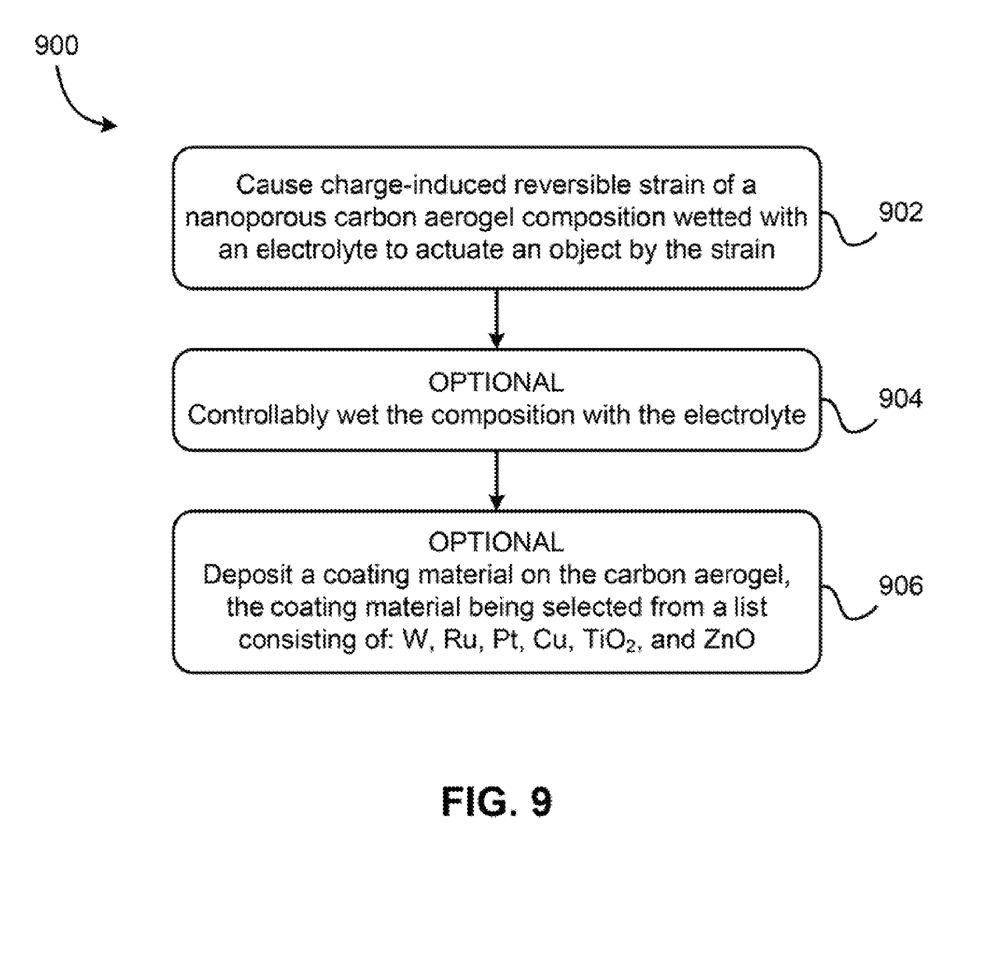
FIG. 9 is a flowchart of a method according to one embodiment.

Now referring to FIG. 9, a method 900 for electrochemically actuating an object is described according to one embodiment. The method 900 may be carried out in any desired environment, and may include some embodiments and/or approaches described herein in addition to those described below.

In operation 902, charge-induced reversible strain of a nanoporous carbon aerogel composition wetted with an electrolyte is caused to actuate an object by the strain. A voltage provided to the composition may preferably be less than about 1.5V, thereby allowing the actuator to be used in environments where voltage reduction is appreciated. However, any voltage may be used such that strain is achieved in the composition.

The composition may be provided in a mechanism, such as an electrochemical cell, such that it is able to be used to actuate the object.

In some embodiments, the carbon aerogel may have a mass-specific surface area of greater than about 2000 $m^2/g$, more preferably greater than about 2800 $m^2/g$.

In more approaches, the carbon aerogel may include a network of interconnected primary particles, the primary particle having a characteristic diameter of between about 3 nm and about 25 nm. In further approaches, the characteristic diameter may be between about 3-10 nm, between about 5-15 nm, between about 12-25 nm, between about 5-20 nm, etc.

According to one embodiment, the electrolyte may comprise at least one of: NaF, KOH, KCl, $H_2SO_4$, and $HClO_4$.

In optional operation 904, the composition may be controllably wetted with the electrolyte. Any electrolyte may be used to controllably wet the composition. Furthermore, the composition may be wetted prior to being provided, such as by encasing the composition in a solution comprising an electrolyte, in which case this step may not be performed. In other embodiments, the composition may be wetted with an electrolyte, but the electrolyte may be replenished periodically when the composition loses some wetted property. Also, the electrolyte may be controlled such that surfaces of the composition are wetted in a controlled manner, thereby also controlling the strain.

According to some approaches, the electrolyte may be aqueous, nonaqueous, a solid-state electrolyte, etc.

In optional operation 906, a coating material may be deposited on the composition, the coating material being selected from a list consisting of: W, Ru, Pt, Cu, $TiO_2$, and ZnO. This coating material may impart properties and/or characteristics to the composition, such as wear resistance, chemical resistance, hardness, smoothness, etc. According to one further embodiment, the coating material may be deposited via atomic layer deposition.

In another preferred embodiment, a system for actuating an object includes an electrochemically driven actuator. The actuator includes a nanoporous carbon aerogel composition wetted by an electrolyte, a mechanism for causing charge-induced reversible strain of the composition, and a mechanism for regulating an amount of the electrolyte contacting a surface of the composition, thereby controlling the amount of charge-induced reversible strain of the composition. The mechanism for regulating an amount of the electrolyte contacting a surface of the composition may be any device as would be known to one of skill in the art, such as a regulator, a valve, an orifice plate, a capillary-force mechanism, etc.

Figure 10:
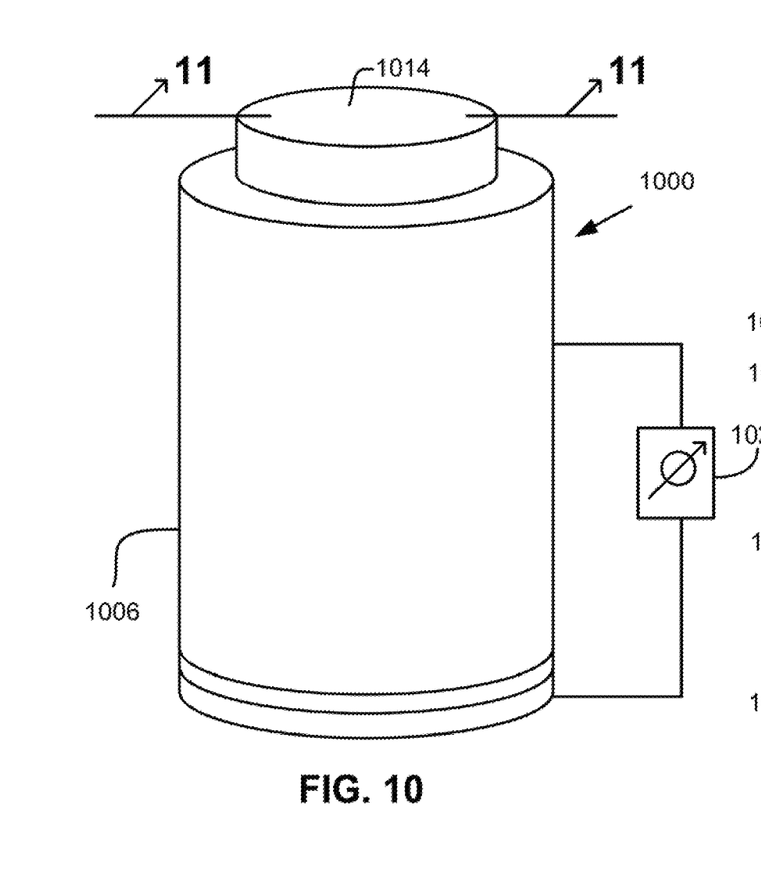
FIG. 10 is a system diagram employing an electrochemical actuator according to one embodiment.
Figure 11:
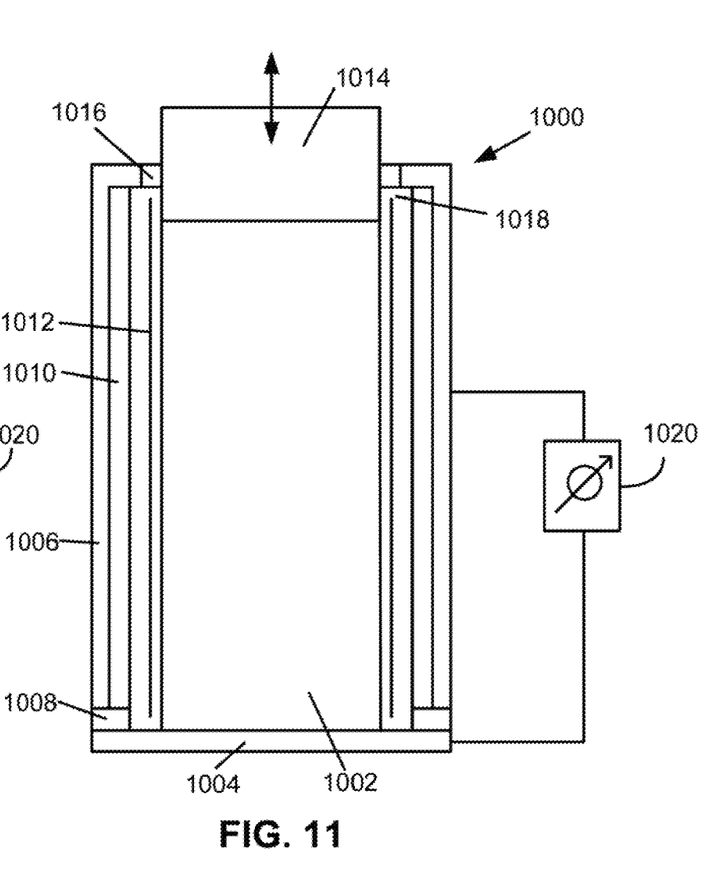
FIG. 11 is a cross sectional view of the system of FIG. 10 taken along Line 11-11 of FIG. 10.

FIGS. 10 and 11 depict a system 1000 comprising an encapsulated actuator and two electrodes according to one embodiment. As shown, the monolithic nanoporous carbon body 1002 rests on or is mounted to an electrically conductive cap 1004, e.g. of steel or other material which acts as one electrode. The carbon body is enclosed in a housing 1006 which may be or include the second electrode. An insulator 1008 may be used to isolate the housing 1006 from the conductive cap 1004. A high surface area liner 1010 may line the housing 1006 and be separated from the monolithic nanoporous carbon body 1002 by a separator 1012. A piston 1014 is actuated by the monolithic nanoporous carbon body 1002. A gasket 1016 may engage the piston. The gasket 1016 may be electrically insulating. An electrolyte 1018 is present in the housing 1006, preferably at least to a height of the monolithic nanoporous carbon body 1002. A potentiostate or other suitable device may be present to control the charge applied to the monolithic nanoporous carbon body 1002.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An electrochemically driveable actuator, comprising:
    a nanoporous carbon aerogel composition capable of exhibiting charge-induced reversible strain when wetted by an electrolyte and a voltage is applied thereto.

2. The electrochemically driven actuator recited in claim 1, wherein the carbon aerogel forms a homogeneous macroscopic monolith with a volume of greater than about 1 $mm^3$.

3. The electrochemically driven actuator recited in claim 1, wherein the carbon aerogel forms a homogeneous macroscopic monolith with a volume of greater than about 1 $cm^3$.

4. The electrochemically driven actuator recited in claim 1, wherein the carbon aerogel forms a homogeneous macroscopic monolith with a volume of greater than about 10 $cm^3$.

5. The electrochemically driven actuator recited in claim 1, wherein the composition further comprises a coating material selected from a list consisting of: W, Ru, Pt, Cu, $TiO_2$, and ZnO.

6. An electrochemically driven actuator, comprising:
    a nanoporous carbon aerogel composition wetted by an electrolyte; and
    a mechanism for causing charge-induced reversible strain of the composition.

7. The electrochemically driven actuator recited in claim 6, wherein the carbon aerogel has a mass-specific surface area of greater than about 2000 $m^2/g$.

8. The electrochemically driven actuator recited in claim 6, wherein the carbon aerogel has a mass-specific surface area of greater than about 2800 $m^2/g$.

9. The electrochemically driven actuator recited in claim 6, wherein the carbon aerogel has a bimodal pore size distribution comprising macropores having an average diameter of greater than about 50 nm and micropores having an average diameter of less than about 2 nm.

10. The electrochemically driven actuator recited in claim 6, wherein the carbon aerogel includes a network of interconnected primary particles, the primary particle having a characteristic diameter of between about 3 nm and about 25 nm.

11. The electrochemically driven actuator recited in claim 6, wherein the carbon aerogel has a three-dimensional architecture that is comprised of nano-particles of graphene.

12. The electrochemically driven actuator recited in claim 6, wherein the electrolyte is aqueous.

13. The electrochemically driven actuator recited in claim 6, wherein the electrolyte is nonaqueous.

14. The electrochemically driven actuator recited in claim 6, wherein the electrolyte comprises at least one material selected from a list consisting of: NaF, KOH, KCl, $H_2SO_4$, and $HClO_4$.

15. The electrochemically driven actuator recited in claim 6, wherein the electrolyte is an ionic liquid.

16. The electrochemically driven actuator recited in claim 6, wherein the electrolyte is a solid-state electrolyte.

17. The electrochemically driven actuator recited in claim 6, wherein the mechanism provides a voltage to the composition of less than about 1.5V.

18. The electrochemically driven actuator recited in claim 6, wherein the composition further comprises a coating material selected from a list consisting of: W, Ru, Pt, Cu, $TiO_2$, and ZnO.

19. The electrochemically driven actuator recited in claim 18, wherein the coating material is deposited via atomic layer deposition.

20. The electrochemically driven actuator recited in claim 6, wherein the composition is isolated from ambient oxygen.

21. A method for electrochemically actuating an object, the method comprising:
    causing charge-induced reversible strain of a nanoporous carbon aerogel composition wetted with an electrolyte to actuate the object by the strain.

22. The method of claim 21, wherein the carbon aerogel has a mass-specific surface area of greater than about 2000 $m^2/g$.

23. The method of claim 21, wherein the carbon aerogel has a mass-specific surface area of greater than about 2800 $m^2/g$.

24. The method of claim 21, wherein the carbon aerogel includes a network of interconnected primary particles, the primary particle having a characteristic diameter of between about 3 nm and about 25 nm.

25. The method of claim 21, wherein the electrolyte is aqueous.

26. The method of claim 21, wherein the electrolyte is nonaqueous.

27. The method of claim 21, wherein the electrolyte comprises at least one of: NaF, KOH, KCl, $H_2SO_4$, and $HClO_4$.

28. The method of claim 21, wherein the electrolyte is an ionic liquid.

29. The method of claim 21, wherein the electrolyte is a solid-state electrolyte.

30. The method of claim 21, wherein a voltage provided to the composition is less than about 1.5V.

31. The method of claim 21, further comprising depositing a coating material on the composition, the coating material being selected from a list consisting of: W, Ru, Pt, Cu, $TiO_2$, and ZnO.

32. The method of claim 31, wherein the coating material is deposited via atomic layer deposition.

33. The method of claim 21, further comprising controllably wetting the composition with the electrolyte.

34. A system for actuating an object, the system comprising:
    an electrochemically driven actuator, comprising:
        a nanoporous carbon aerogel composition wetted by an electrolyte;
        a mechanism for causing charge-induced reversible strain of the composition; and
        a mechanism for regulating an amount of the electrolyte contacting a surface of the composition, thereby controlling the amount of charge-induced reversible strain of the composition.

* * * * *